United States Patent Office 3,259,642
Patented July 5, 1966

3,259,642
PROCESS FOR THE PRODUCTION OF METAL-CYCLOPENTADIENYL COMPOUNDS
Günther O. Schenck and Ernst Koerner von Gustorf, Mulheim (Ruhr), Germany, assignors to Studiengesellschaft Kohle m.b.H., Mulheim (Ruhr), Germany
No Drawing. Filed Oct. 16, 1962, Ser. No. 230,984
Claims priority, application Germany, Oct. 18, 1961, St 18,449
11 Claims. (Cl. 260—429)

This invention relates to a process for the production of metal-cyclopentadienyl compounds.

A number of processes permitting the production of metal-cyclopentadienyl compounds, particularly of the transition metals, e.g., for the production of ferrocene, have been suggested. Especially those processes listed below appear to be important up to the present:

(1) Reaction of cyclopentadiene with metals, metal oxides and metal carbonates at elevated temperatures, particularly in the gaseous phase or in the gas-solids heterogenous system.

(2) Reaction of suitable transition metal compounds, particularly of the anhydrous halides, with cyclopentadiene in the liquid phase in the presence of suitable bases such as organic amines.

(3) Reaction of the cyclopentadienyls of alkali metals, alkaline earth metals, magnesium, zinc or beryllium with anhydrous halides, thiocyanates, acetylacetonates and similar derivatives of the transition metals with exclusion of air in anhydrous solvents such as ethers, amines, liquid $NH_3$, etc.

These processes still exhibit certain disadvantages for large-scale operation. The first-mentioned process gives poor space-time yields, particularly in the heterogenous systems, due to rapid "plugging" of necessary active surfaces. In case of the second and third processes mentioned above, all solvents must be kept strictly anhydrous. The transition metal compounds must be dehydrated and, in certain cases, converted into a particularly active form. The third process mainly suffers from the disadvantage that it requires water-sensitive metals such as sodium, the reaction of which with cyclopentadiene frequently takes place only with a high expense of time and evolution of undesirable hydrogen. During the course of the process, this alkali or alkaline earth metal is converted into a salt of little use which can hardly be returned into the process in an economic manner. Furthermore, the metal-cyclopentadienyls required as the starting materials are very sensitive to air so that they require strict exclusion of air and the use of protective gases throughout the process. These necessities entail a high expense and constitute a hazard for the operators.

The invention provides a new route to the production of metal-cyclopentadienyl compounds, the new process starting from readily available materials and requiring no special precautions regarding the process conditions unless the resultant metal-cyclopentadienyl compounds require these precautions in a manner known per se in individual cases. The new process is based on the surprising finding that cyclopentadienyl compounds of a specific metal, i.e., of thallium, are outstandingly suited for an exchange with compounds of other metals.

In accordance with the invention, a process for the production of cyclopentadienyl compounds of metals of the 1st and 2nd subgroups and 3rd to 8th groups of the Periodic Table by reaction with salts of these metals with a cyclopentadienyl compound, if desired in the presence of further reactants such as CO, $O_2$ or other components known for the production of stable metal-cyclopentadienyl compounds comprises reacting halides and/or pseudo halides of the particular metal with a thallium-cyclopentadienyl compound, preferred halides being the chlorides.

Thallium-cyclopentadienyl (hereafter referred to as TlCP) which, for example, is used as the starting material for the process of the invention is stable to air and water and can be stored for months without undergoing decomposition. Despite this high stability of the starting compound and despite the fact that it is an extremely sparingly soluble solid, TlCP in the process of the invention shows pronounced reactivity when reacted with the above-mentioned compounds of the metals which are to be brought into a state of linkage with the cyclopentadienyl group.

Suitable metal salts for the reaction with TlCP and its analogous compounds substituted in the cyclopentadienyl group are in principle those which lead to new metal-cyclopentadienyl compounds, the back reaction of which with the thallium halides (pseudo halides) formed in the reaction is insignificant. This condition, as a first approach, is met by those metals the electronegativity according to Pauling of which is higher than that of thallium. However, such classification does not take into account any additional energetically favorable effects which, for example, may be due to stabilization of the electron systems of the compound which is formed. Thus, for example, it is also possible in accordance with the invention to react manganese which per se has a lower value in electronegativity series than that of thallium. Based on the division of the Periodic Table published by M. A. Fineman, R. Daignault in J. Inorg. Nucl. Chem., 10, 205 (1959), the metals of the following sub- and main groups are particularly suitable for the reaction of the invention:

IB (Cu, Ag, Au)
IIB (Hg)
IIIB (B, Al, Ga, In)
IVB (Si, Ge, Sn, Pb)    IVA (Ti, Zr)
VB (As, Sb, Bi)    VA (V, Nb, Ta)
VIB (Se, Te)    VIA (Cr, Mo, W)
    VIIA (Mn)
VIII (Fe, Co, Ni, Os+other noble metals)

The process of the invention is of particular interest for the production of cyclopentadienyl compounds of the transition metals, among the particular important metals being Fe, Co, Ni, Cr, Ti, V, Mn.

In a modification of the embodiment of the process of the invention described above, organically substituted metal halides may also be reacted with thallium-cyclopentadienyl. An example hereof is the reaction of triphenyl tin chloride with thallium cyclopentadienyl. However, this embodiment of the process of the invention is restricted by the stability of the organically substituted metal halides. Of the organically substituted metal halides which at present are known to be sufficiently stable those of the following metals may be used in the process of the invention: Au, Hg, B, Al, Si, Ge, Sn, Pb, As, Sb, Bi, Se and Te.

The reaction of the invention, may, on principle, be carried out without the use of solvents, e.g., by trituration of the solid components and subsequent separation, e.g., by extraction, of the metal-cyclopentadienyl compound formed. However, it is preferred to effect the process of the invention in the presence of conventional solvents in which especially the metal-cyclopentadienyl compound produced is soluble. Thus, suspensions of the substantially hardly soluble TlCP compounds in organic solvents such as alcohols, e.g., methanol or ethanol; ketone such as acetone; esters such as ethyl acetate; ethers such as diethyl ether, dioxane, tetrahydrofuran; sulfoxides such as dimethyl sulfoxide, or pure hydrocarbon solvents of aliphatic or aromatic nature may be reacted with the above-mentioned metal compounds in a simple manner.

It is a particular advantage of the process of the invention that it can be carried out in the presence of water unless this is made impossible by the resultant metal-cyclopentadienyl compounds, on the one hand, or metal halides (such as $TiCl_4$, $VCl_4$, etc.) which are susceptible to hydrolysis, on the other hand. Thus, the process of the invention normally does not require anhydrous solvents. It may even be preferred to operate in water-containing solvents. This simplification can be driven so far that the process can frequently be carried out even in the presence of water without any additional solvent. It appeared, however, that it is favorable to use considerably less water than ecessary to dissolve the metal halide. Thus, for example, the amount of water used is chosen such that about one third of the metal halide is dissolved, the space-time yields becoming poor when all of the metal halide is dissolved.

While this alone is a substantial facilitation of the process of the invention over the prior art processes, it is associated with a second and very important improvement. It is not only the solvent which may be water-containing. It is also possible in accordance with the invention to start from metal halides which contain water of crystallization. Thus, for example, ferrocene, nickelocene and the cobalticinium ion can be produced with good success from the corresponding halides containing water of crystallization. As already mentioned it is self-evident in this case that only those metal halides can be reacted with thallium cyclopentadienyl in the presence of water which are not modified by water (e.g., by hydrolysis). It is true that when effecting such a reaction in the presence of water the latter serves only as solvent for the metal halide used because the other reactants in general are hardly water-soluble. However, a substantial improvement of the process can be achieved by this embodiment. The advantage resides in the following fact:

If, for example, a mixture of thallium cyclopentadienyl and $FeCl_2.4H_2O$ has been reacted, excess $FeCl_2.4H_2O$ dissolves in water and can be separated very easily and, if desired, reused in a new process.. There are left the produced thallium halide, the produced metal cyclopentadienyl compound and, as the case may be, excess thallium cyclopentadienyl. The metal-cyclopentadienyl compound produced can be easily isolated by extraction with an organic solvent or in any other manner known per se. The remaining mixture of thallium halide and thallium cyclopentadienyl is now free from iron salt hydrolyzing in an alkaline medium, which may be very essential for the regeneration of the thallium reaction products, which regeneration will be dealt with hereafter.

The reaction is desirably effected with an efficient mixing device to reduce the reaction time since at least the thallium cyclopentadienyl is present as a solid phase in the reaction mixture. Examples of particularly suitable apparatus include dispersing, comminution or supersonic apparatus. If air-sensitive metal-aromatic complexes are formed in the reaction of the invention, it is recommendable to effect the reaction under a protective gas atmosphere. Due to the extremely poor solubility of TlCP, of the thallium halides and/or pseudo halides produced and particularly of metal halides containing water of crystallization in conventional organic solvents, the invention opens a particularly simple route to the production of the metal-aromatic complexes desired. This embodiment of the process of the invention is in fact operated in a solvent in which the starting materials are insoluble or only very sparingly soluble while the metal-cyclopentadienyl compound formed in the reaction is dissolved therein. Upon completion of the reaction, any remaining solid portions are simply separated and the solvent is removed from the liquid phase thus obtained, e.g. by distillation. In this manner a product which is already very pure is obtained without any further purification.

Not only thallium cyclopentadienyl itself but also analogous thallium compounds which are substituted in the cyclopentadienyl radical can be used for the process of the invention. Thus, for example, thallium cyclopentadienyl compounds substituted in a manner known per se with alkyl, aryl or acyl groups can be converted into the corresponding different metal-cyclopentadienyl compounds with excellent yields. The reaction itself is largely independent of the temperature. If solvents are used, the reactions can substantially be effected in the temperature range between the solidification point and the boiling point of the solvent used. If desired, elevated pressures may be used.

It is further possible in accordance with the invention to operate in the presence, in a manner known per se, of further components which lead to stable metal-cyclopentadienyl complexes. Thus, for example, the reaction between manganese halides and methyl thallium cyclopentadienyl is effected under a CO atmosphere to form the known methyl-cyclopentadienyl-manganese tricarbonyl which is possibly formed in known manner from intermediarily produced di-(methylcyclopentadienyl)-manganese.

It is further known, for example, that when producing cobaltocene in the air, oxidation to form the cobalticiniumion takes place immediately. In order that the reaction is directed as reliably as possible to the cobalticiniumion, an oxygen-containing gas may be introduced in the reaction between, for example, TlCP and crystallization water-containing cobalt halide. Reactions between metal halides and thallium cyclopentadienyl compounds invariably yield those metal-cyclopentadienyl compounds which have optimum stability according to their electron configuration. Use of $TiCl_4$, for example, gives $Ti(C_5H_5)_2Cl_2$ which is stable even in the air while the pure cyclopentadienyl compound $Ti(C_5H_5)_2$ which is rather instable especially in the air is not obtained. This explains the partially different constitution of the reaction products.

In addition to the above-mentioned advantages of the present process, the thallium cyclopentadienyl contributes an important innovation especially for commercial utilization. During the course of the process of the invention, thallium halides or pseudohalides are formed in addition to the metal-aromatic complexes. It was demonstrated by the applicants in their earlier filed U.S. patent application 211,090, that it is possible in a very simple manner to convert these thallium halides or pseudohalides into thallium-cyclopentadienyl compounds. Thus, it is easily possible by this prior art process to produce the starting materials for the process of the invention described herein from the thallium salts obtained as by-product in the process of the invention.

Accordingly, the invention comprises a cyclic process involving a first step in which a thallium cyclopentadienyl compound is converted in the manner described herein to form the metal-aromatic complex desired and a second step in which the thallium halide or pseudo halide formed as by-product in the first step is reconverted into the starting thallium-cyclopentadienyl compound by the process of the above-mentioned earlier filed patent application. This cyclic process is illustrated with reference to the ferrocene synthesis:

(1) Production: $2TlC_5H_5 + 4FeCl_2.4H_2O \longrightarrow$

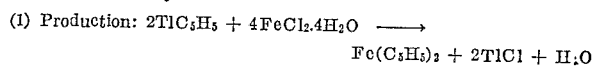

(2) Regeneration: $2TlCl + 2C_5H_6 + KOH \xrightarrow{in\ H_2O}$

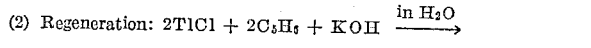

As described in the above-mentioned earlier filed patent application, this regeneration is not restricted to KOH as the base. It is only necessary that a compound of sufficiently high basicity be used that, dependent upon the Tl+ concentration in the particular reaction mixture, the cyclopentadienyl anion concentration is sufficiently high to go below the solubility product of the thallium-organic compound. Thus, one has the possibility for this embodiment of the process of the invention to operate without consumption of the expensive thallium metal while the waste product, e.g., KCl, NaCl, $CaCl_2$, etc., is obtained from a cheap basic compound.

The process may be carried out in continuous or batchwise operation. It is pointed out merely for completeness that it is possible in accordance with the invention to replace the metal halide to be reacted with thallium cyclopentadienyl by a salt of this metal with a different acid and to use this salt in the reaction in the presence of halide ions. Thus, for example, a mixture of iron sulfate and sodium chloride may be used in place of iron chloride.

Example 1

To produce ferrocene, 250 ml. of peroxide-free diethyl ether was poured on 53.80 gms. (0.2 mole) of thallium cyclopentadienyl and 39.76 gms. (0.2 mole) of $FeCl_2 \cdot 4H_2O$ in a 500 ml. flask. The mixture was vigorously stirred for an hour in an "Atom-mix-Mill." The solution which was of orange color was separated from the reaction residue which was exhaustively extracted with diethyl ether in a Soxhlet apparatus. After removal of the solvents, 12 to 14 gms. (0.065 to 0.075 mole) of pure ferrocene corresponding to 65–75% of theory crystallized; M.P. 174° C.

Example 2

250 ml. of peroxide-free ether were poured into 48.93 gms. (0.173 mole) of thallium-methyl-cyclopentadienyl and 34.31 gms. (0.173 mole) of $FeCl_2 \cdot 4H_2O$ and the mixture was stirred for an hour with an "Atom-mix-Mill." The solution of orange color was filtered and the residue exhaustively extracted in a Soxhlet apparatus (0.83 gm. of extract). After having driven off the solvents, a total of 17.221 gms (0.0804 mole) of dimethyl ferrocene crystallizing as orange-colored platelets was obtained. This corresponded to a yield of 93% of theory; M.P. 37.5–38° C.

Example 3

250 ml. peroxide-free ether were poured onto 25.16 gms. (0.0772 mole) of thallium-tert.butyl-cyclopentadienyl and 15.38 gms. (0.0773 mole) of $FeCl_2 \cdot 4H_2O$ and the mixture was stirred for 2 hours with an "Atom-mix-Mill." The red-brown solution was separated from the reaction residue which was stirred up with 200 ml. of ether and washed. After having driven off the ether, there remained 11.283 gms. (0.0378 mole) of a red-brown liquid of camphor-like odor which upon cooling crystallized to form orange-colored platelets (melting point in crude state, 25–26° C.) which after squeezing with absorbent paper melted at 28–28.5° C.; yield, 97.8% of theory.

Example 4

70 ml. of ether were poured onto 2.61 gms. (8.8 millimoles) of thallium-ethyl-cyclopentadienyl and 0.88 gm. (4.4 millimoles) of $FeCl_2 \cdot 4H_2O$ and the mixture was stirred for 20 minutes with an "Atom-mix-Mill." The red-brown solution was separated from the reaction residue and the ether driven off. Diethyl ferrocene was obtained as a red-brown oil in an amount of 0.68 gm. (2.8 mmoles) = 64% of theory.

CH analysis.—Calculated for $Fe(C_2H_5C_5H_4)_2$: 69.5% C, 7.4% H. Found: 69.5% C, 7.4% H.

Example 5

A solution of 3.61 gms. $FeCl_3$ (anhydrous) (0.0223 mole) was added within 3 to 4 minutes to 20.00 gms. (0.0741 mole) of thallium-cyclopentadienyl and 100 ml. of peroxide-free ether while stirring with an "Atom-mix-Mill." Each drop of the $FeCl_3$ solution first caused the appearance of a green-blue color in the reaction mixture. However, this color always turned to yellow-orange. After 25 minutes of stirring, the yellow-orange solution was separated from the reaction residue by repeated filtration. After having driven off the ether, there remained 4.910 gms. of a substance having the color of ferrocene and a melting point of 175–176° C. The yield was 0.0264 mole = 118% of theory. Therefore, an impurity which did not influence the melting point of ferrocene must have been present.

2.000 gms. of this product were exhaustively extracted with cold ether and the extract evaporated to dryness to give 1.533 gms. of ferrocene = 76.7% of the starting material; M.P. 174° C. Undissolved material was 0.404 gm., loss 0.063 gm. Thus, the yield mentioned above of 4.910 gms. contains 76.7% = 3.76 gms. of ferrocene = 0.0202 mole = 90.5% of theory.

Example 6

250 ml. of diethyl ether were poured onto 53.8 gms. (0.2 mole) of thallium cyclopentadienyl and 43.92 gms. (0.2 mole) of $NiCl_2 \cdot 5H_2O$ and the mixture was vigorously stirred for 1 to 2 hours with an "Atom-mix-Mill." The dark green solution was separated from the reaction residue which was exhaustively extracted with ether. 10–15.4 gms. (0.053–0.082 mole) of nickelocene having a melting point of 168–170° C. crystallized upon evaporation of the solvent. Nickelocene can be sublimed at 10 mm. Hg and 110° C. M.P. 170–174° C.

Example 7

350 ml. of peroxide-free ether were poured onto 47.32 gms. (0.167 mole) of thallium-methyl-cyclopentadienyl and 36.65 gms. (0.167 mole) of $NiCl_2 \cdot H_2O$ and the mixture was stirred for 55 minutes with an "Atom-mix-Mill" under an argon atmosphere. The reaction product was filtered under argon and the filtrate was freed from ether under argon. The residue comprised 12.89 gms. (0.0593 mole) of dimethyl-nickel-ocene having a melting point of 30–32° C. Extraction of the reaction residue with 250 ml. of ether while stirring with an "Atom-mix-Mill" gave additional 2.41 gms. (0.0111 mole) of dimethyl-nickelocene. Total yield: 15.30 gms. (0.0704 mole) = 84.3% of theory; M.P. 35–36° after vacuum distillation.

Example 8

250 ml. of peroxide-free ether were poured onto 25.647 gms. (0.0789 mole) of thallium-tert.butyl-cyclopentadienyl and 17.30 gms. (0.0789 mole) of $NiCl_2 \cdot 5H_2O$ (Merck) and the mixture was stirred for 115 minutes with an "Atom-mix-Mill" under an argon atmosphere. The reaction mixture was cooled and filtered under argon. The filtrate was concentrated under argon. There remained 4.234 grams (0.0141 mole) of a deep green crystalline mass corresponding to a yield of 35.7% of theory of di-tert.butyl-nickelocene; M.P. 48–50° C.

Example 9

140 ml. of ether and 60 ml. of ethanol were poured onto 23.8 gms. (0.10 mole) of $CoCl_2 \cdot 6H_2O$ and 26.95 gms. (0.10 mole) of thallium-cyclopentadienyl and the mixture was stirred for 95 minutes with an "Atom-mix-Mill" while passing through a vigorous $O_2$ stream. The ether phase which was of green-yellow color was separated and extracted with water and some $N/1 H_2SO_4$. The reaction residue was also extracted with water. The combined aqueous extracts were made alkaline with NaOH and mixed with $H_2S$ until a black precipitate was no longer separated. A total of 1020 ml. of filtrate was obtained after precipitation with $H_2S$. An amount of 102 ml. of the filtrate was acidified with concentrated HCl, diluted to about 350 ml. and precipitated with a solution of 2 gms. of "Kalignost" in 60 ml. of water. The resultant flaky yellow precipitate was separated by filtration, washed and dried over $P_2O_5$. Yield: 2.073 gms. = 20.73 gms. (based on the total amount) = 0.0408 mole = 81.6% of theory of $(C_5H_5)_2Co^+B(C_6H_5)_4^-$.

Example 10

200 ml. of dioxane (peroxide-free and absolute) were poured onto 65.89 gms. (0.233 mole) of methyl-thallium cyclopentadienyl, 29.3 gms. (0.233 mole) of $MnCl_2$ (anhydrous) and 3.1 gms. (0.0233 mole) of $AlCl_3$ and the mixture was refluxed under argon while stirring. Thereafter the dioxane was distilled off except for a residue of about 30 gms. and the reaction mixture was mixed with 0.63 gm. (0.023 mole) of Al powder and filled under argon into a rotary autoclave which contained porcelain balls for mixing. The autoclave was operated for 78 hours under 300 atmospheres of CO pressure at 144–179° C. The entire reaction product was subjected to steam distillation which gave a green-yellow oil as the overhead product containing $CH_3C_5H_4Mn(CO)_3$.

Example 11

13.34 gms. (0.10 mole) of anhydrous $AlCl_3$ were added to 250 ml. of absolute ether under an argon atmosphere (while stirring with "Atom-mix-Mill"). Thereafter 88.94 gms. of thallium cyclopentadienyl (0.33 mole) were added in portions and the mixture was stirred for 150 minutes. The resultant yellow solution was separated from the reaction residue by repeated filtration and the ether was evaporated at room temperature under vacuum. There remained 3.423 gms. of a yellow-brown, water- and air-sensitive residue having the composition $Al_2Cl_5C_5H_5 \cdot 2(C_2H_5)_2O$.

Example 12

5.0 gms. (0.013 mole) of triphenyl tin chloride and 3.7 gms. (0.014 mole) of thallium cyclopentadienyl were stirred for 15 minutes in 180 ml. of tetrahydrofuran with an "Atom-mix-Mill." After having driven off the solvent, 4.34 gms. (0.0105 mole) of triphenyl tin cyclopentadienyl=81% of theory were obtained. M.P. 120° C.

Example 13

20.0 gms. (0.074 mole) of thallium cyclopentadienyl and 6.0 gms. (0.032 mole) of $TiCl_4$ were stirred for 2 hours in 250 ml. of tetrahydrofuran with an "Atom-mix-Mill." After filtration and evaporation of the solvent, dicyclopentadienyl titanium dichloride in the form of dark red crystals remained in an amount of 7.20 gms. (0.029 moles)=91% of theory. M.P. 290° C. with decomposition (from chloroform/toluene).

Example 14

33.3 gms. (0.124 mole) of thallium cyclopentadienyl and 1.0 gms. (0.052 mole) of $VCl_4$ were stirred for 2 hours in 420 ml. of tetrahydrofuran with an "Atom-mix-Mill." After filtration and evaporation of the solvent, dicyclopentadienyl vanadium dichloride in the form of dark green crystals remained in an amount of 13.0 grams (0.052 mole). M.P. 250° C. (with decomposition; from chloroform/toluene). The yield corresponded to 99% of theory.

Example 15

1st cycle: 200 mol. of peroxide-free dioxane were poured onto 20.00 gms. (0.0742 mole) of thallium cyclopentadienyl and 5.90 gms. (0.0297 mole) of $FeCl_2 \cdot 4H_2O$ and the mixture was stirred for 90 minutes with an "Atom-mix-Mill." After filtration, the residue was washed with dioxane until it was free from ferrocene and regenerated in 200 ml. of KOH (10%) with 4.900 gms. (0.0742 mole) of cyclopentadiene.

2nd cycle: The regenerated thallium cyclopentadienyl was again reacted with 5.90 gms. (0.0297 mole) of $FeCl_2 \cdot 4H_2O$ in 200 ml. of dioxane. Regeneration was effected with 4.900 gms. (0.0742 mole) of cyclopentadiene.

3rd cycle: Reaction of the regenerated thallium cyclopentadienyl with 5.90 gms. (0.0742 mole) of $FeCl_2 \cdot 4H_2O$ in 200 ml. of dioxane.

The combined solutions of ferrocene were distilled. The residue consisted of 11.871 gms. (0.0638 mole) of ferrocene=71.6% of theory based on a total of 0.0891 mole of $FeCl_2 \cdot 4H_2O$ charged.

Example 16

2.0 gms. ($1.0 \cdot 10^{-2}$ moles) of $FeCl_2 \cdot 4H_2O$ and 5.0 gms. ($1.86 \cdot 10^{-2}$ moles) of TlCP were triturated dry for 20 minutes in a mortar. The solid mixture was then extracted with diethyl ether. The residue after evaporation of the solvent consisted of 1.66 gms. of ferrocene ($0.98 \cdot 10^{-2}$ moles)=96% of theory. M.P. 170° C.

Example 17

13.0 gms. ($6.55 \cdot 10^{-2}$ moles) of $FeCl_2 \cdot 4H_2O$ and 10.0 gms. TlCP ($3.72 \cdot 10^{-2}$ moles) were triturated with 8 ml. of water for 30 minutes in a mortar. After extraction of the reaction product with ether, there remained 0.454 gms. of ferrocene ($0.24 \cdot 10^{-2}$ moles)=13% of theory. M.P. 170° C.

Example 18

18.0 gms. ($7.55 \cdot 10^{-2}$ moles) of $CoCl_2 \cdot 6H_2O$ and 10.0 gms. ($3.72 \cdot 10^{-2}$ moles) of TlCP were triturated for 10 minutes with 8 ml. of water in a mortar. After addition of 25 ml. HCl (5%) and separation of excess $Tl^+$ and $Co^{++}$, 9.2 gms. ($1.81 \cdot 10^{-2}$ moles) of cobalticinium tetraphenyloborate=97% of theory are obtained by precipitation with "Kalignost" sodiumtetraphenyl borate (Heyl & Co., Berlin, Germany).

Example 19

10.1 gms. ($3.64 \cdot 10^{-2}$ moles) of $FeSO_4 \cdot 7H_2O$ and 10.5 gms. ($3.9 \cdot 10^{-2}$ moles) TlCP were stirred for 75 minutes in 130 ml. of diethyl ether with an "Atom-mix-Mill." Substantially no ferrocene was formed thereby. Stirring was continued for 1.5 hours after addition of 19.9 gms. (0.336 mole) NaCl. The ether phase which gradually acquired a yellow-orange color was separated and the ether evaporated. The residue consisted of 0.5 gm. ($2.7 \cdot 10^{-3}$ moles) of ferrocene=14% of theory.

Example 20

3 gms. ($2.44 \cdot 10^{-2}$ moles) $CrCl_2$ and 12.7 gms. ($4.72 \cdot 10^{-2}$ moles) TlCP are stirred for 30 minutes in 150 ml. of tetrahydrofuran with an "Atom-mix-Mill." From the filtrate, 3.54 gms. ($1.95 \cdot 10^{-2}$ moles)

$$Cr(C_5H_5)_2 = 82.5\%$$

of theory are obtained as raw product which is purified by sublimation. Calculated for $Cr(C_5H_5)_2$: 28.6% Cr; Found, 28.0%.

Example 21

2.83 gms. ($8.5 \cdot 10^{-3}$ moles) $OsCl_4$ and 11.7 gms. ($4.35 \cdot 10^{-2}$ moles) TlCP are stirred for 13 hours in 200 ml. of tetrahydrofuran with an "Atom-mix-Mill." The residue obtained from the filtrate after evaporation of the solvent and sublimation (150° C./0.3 mm. Hg) gives 0.27 gms. $Os(C_5H_5)_2$ ($8.4 \cdot 10^{-4}$ moles)=9.9% of theory. M.P. (in tube), 220° C. (from benzene).

Example 22

10.2 gms. ($5.1 \cdot 10^{-2}$ moles) $FeCl_2 \cdot 4H_2O$ and 18.5 gms. ($5.1 \cdot 10^{-2}$ moles) of cycloheptatrienyl-thalliumcyclopentadienyl are stirred in 300 ml. of diethyl ether for 45 minutes with an "Atom-mix-Mill." The residue obtained after filtration and evaporation of the ether consists of 8.82 gms. ($2.41 \cdot 10^{-2}$ moles) or dicycloheptatrienyl-ferrocene=94% of theory. M.P. 65–66° (from methanol).

What we claim is:

1. Process for the production of ferrocene, which comprises reacting thallium cyclopentadienyl and $FeCl_2 \cdot 4H_2O$, and recovering the ferrocene thus produced.

2. Process for the production of ferrocene, which comprises reacting an organo ring-substituted thallium cyclopentadienyl compound with $FeCl_2 \cdot 4H_2O$, wherein organo represents a member selected from the group consisting of alkyl and aryl radicals, and recovering the ferrocene thus produced.

3. Process for the production of nickel cyclopentadienyl, which comprises reacting thallium cyclopentadienyl and NiCl$_2$·5H$_5$O, and recovering the nickel cyclopentadienyl thus produced.

4. Process for the production of cobalticinium tetraphenyloborate, which comprises reacting thallium cyclopentadienyl sodium tetraphenyl borate and CoCl$_2$·6H$_2$O, and recovering the cobalticium tetraphenyloborate thus produced.

5. Process for the production of the aluminum cyclopentadienyl (Al$_2$Cl$_5$C$_5$H$_5$—2(C$_2$H$_5$)$_2$O), which comprises reacting thallium cyclopentadienyl and AlCl$_3$, in the presence of absolute ether, and recovery the aluminum cyclopentadienyl thus produced.

6. Process for the production of triphenyl tin cyclopentadienyl, which comprises reacting thallium cyclopentadienyl and triphenyl tin chloride, and recovering the triphenyl tin cyclopentadienyl thus produced.

7. Process for the production of titanium dicyclo pentadienyl dichloride, which comprises reacting thallium cyclopentadienyl and TiCl$_4$, and recovering the titanium dicyclopentadienyl dichloride thus produced.

8. Process for the production of dicyclopentadienyl vanadium dichloride, which comprises reacting thallium cyclopentadienyl and VCl$_4$, and recovering the dicyclopentadienyl vanadium dichloride thus produced.

9. Process for the production of a metal cyclopentadienyl compound which comprises reacting thallium cyclopentadienyl with a member selected from the group consisting of metal halides and aryl substituted metal halides, wherein said metal is less electro-positive than thallium and is a member selected from the group consisting of Groups I$b$, II$b$, III$b$, IV$a$, IV$b$, V$a$, V$b$, VI$a$, VI$b$, VII$a$, and VIII metals, said group member not being susceptible to hydrolysis and said reaction being effected in the presence of water as solvent and recovering the metal cyclopentadienyl compound formed in the reaction.

10. A continuous process for the production of a metal cyclopentadienyl compound which comprises reacting thallium cyclopentadienyl with a member selected from the group consisting of metal halides and aryl substituted metal halides, wherein said metal is less electro-positive than thallium and is a member selected from the group consisting of Groups I$b$, II$b$, III$b$, IV$a$, IV$b$, V$a$, V$b$, VI$a$, VI$b$, VII$a$, and VIII metals, recovering the metal cyclopentadienyl compound thus obtained, reacting the thallium chloride formed in said reaction with cyclopentadiene in the presence of alkali and water and recycling the thallium cyclopentadienyl compound thus formed into the reaction.

11. Process for the production of a metal cyclo-pentadienyl compound which comprises reacting thallium cyclopentadienyl with a member selected from the group consisting of metal halides and aryl substituted metal halides, wherein said metal is less electro-positive than thallium and is a member selected from the group consisting of Groups I$b$, II$b$, III$b$, IV$a$, IV$b$, V$a$, V$b$, VI$a$, VI$b$, VII$a$, and VIII metals, said group member containing water of crystallization, and recovering the metal cyclopentadienyl compound formed in the reaction.

References Cited by the Examiner

UNITED STATES PATENTS 2,987,534    6/1961    Shapiro et al. _____ 260—429

OTHER REFERENCES

Rochow et al., The Chemistry of Organometallic Compounds, John Wiley and Sons, Inc. (New York), 1957, pages 16, 17 51 and 52.

TOBIAS E. LEVOW, *Primary Examiner.*

E. C. BARTLETT, T. L. IAPALUCCI,
*Assistant Examiners.*

UNITED STATES PATENT OFFICE
CERTIFICATE OF CORRECTION

Patent No. 3,259,642                      July 5, 1966

Günther O. Schenck et al.

It is hereby certified that error appears in the above numbered patent requiring correction and that the said Letters Patent should read as corrected below.

Column 2, line 58, for "As." read -- as, --; lines 69 and 70, for "ketone" read -- ketones --; column 3, line 15, for "ecessary" read -- necessary --; column 5, line 31, for "into" read -- onto --; column 6, line 6, for "mole=118%" read -- mole≙118% --; line 11, for "ferrocene=76.7%" read -- ferrocene ≙76.7% --; line 15, for "mole=90.5%" read -- mole≙90.5% --; line 42, for "mole)=84.3%" read -- mole)≙84.3% --; line 74, for "gms.=20.73 gms." read -- gms.≙20.73 gms. --; line 75, for "=81.6%" read -- ≙81.6% --; column 7, line 36, for "pentadienyl=81%" read -- pentadienyl≙81% --; line 45, for "moles)=91%" read -- moles)≙91% --; column 8, line 3, for "ferrocene=71.6%" read -- ferrocene≙71.6% --; line 12, for "moles)=96%" read -- moles)≙96% --; line 19, for "moles)= 13%" read -- moles)≙13% --; line 27, for "=97%" read -- ≙97% --; line 40, for "=14%" read -- ≙14% --; line 47, for "Cr(C$_5$H$_5$)$_2$=82.5%" read -- Cr(C$_5$H$_5$)$_2$≙82.5% --; line 58, for, "=9.9%" read -- ≙9.9% --; line 68, for "rocene=94%" read -- rocene≙94% --; column 9, line 11, for "cobalticium" read -- cobalticinium --; line 16, for "recovery" read -- recovering --; column 10, line 11 for "jentadienyl" read -- pentadienyl --; line 35, for "pages 16, 17 51" read -- pages 16, 17, 51 --.

Signed and sealed this 1st day of August 1967.

(SEAL)
Attest:

EDWARD M. FLETCHER, JR.                    EDWARD J. BRENNER
Attesting Officer                          Commissioner of Patents